United States Patent [19]

Derman

[11] Patent Number: 4,924,683
[45] Date of Patent: May 15, 1990

[54] LOCKING DEVICE FOR COMPUTER DISK DRIVES AND THE LIKE

[76] Inventor: Jay S. Derman, P.O. Box 949, Redondo Beach, Calif. 90277

[21] Appl. No.: 459,519

[22] Filed: Jan. 2, 1990

[51] Int. Cl.$^5$ .............................................. E05B 73/00
[52] U.S. Cl. ........................................... 70/14; 70/58
[58] Field of Search ................................ 70/14, 57, 58

[56] References Cited

U.S. PATENT DOCUMENTS

| | | | |
|---|---|---|---|
| 1,864,883 | 6/1932 | Anderson | 70/14 |
| 2,716,881 | 9/1955 | Terrill | 70/14 |
| 4,131,001 | 12/1978 | Gotto | 70/14 |
| 4,616,490 | 10/1986 | Robbins | 70/14 |
| 4,640,106 | 2/1987 | Derman | 70/14 |
| 4,856,304 | 8/1989 | Derman | 70/14 |

*Primary Examiner*—Robert L. Wolfe
*Attorney, Agent, or Firm*—Monty Koslover Assoc.

[57] ABSTRACT

A device for discouraging unauthorized use of a computer disk drive, cassette tape deck, CD player or similar equipment. The device includes a block, a flat, projecting member which is sized to fit inside the slot opening of the disk drive or tape deck, and a "showcase" type locking mechanism. This type of mechanism employs a relatively thin strip of metal, having a serrated edge and a cylinder lock which ratchets along the strip, making for a compact lock. In this application, the serrated metal strip is bent 90 degrees at one end, forming a hook that holds on to the inside wall of the disk drive or cassette chamber. When the device projecting member and locking strip are inserted inside the slot opening of the drive, filling it, the block is pushed and held against the face of the drive, blocking access to it.

4 Claims, 2 Drawing Sheets

LOCKING DEVICE FOR COMPUTER DISK DRIVES AND THE LIKE

BACKGROUND OF THE INVENTION

1. Field of the Invention

This invention relates to locking devices used for securing computer equipment and cassette tape decks, and more particularly, to a device for preventing unauthorized use of computer floppy disk drives or cassette tape decks.

2. Description of the Prior Art

The invention is an improvement on devices such as U.S. Pat. No. 4,856,304 by Jay S. Derman, U.S. Pat. No. 4,640,106 by Jay S. Derman and U.S. Pat. No. 4,131,001 by Raymond J. Gotto. U.S. Pat. No. 4,131,001 utilizes a cassette-shaped part for insertion in the cassette chamber opening. The rotation of a lock cylinder moves projecting arms and locking members against the inside chamber surfaces preventing removal of the locking device. U.S. Pat. No. 4,856,304 utilizes a transverse plastic block and a "T" shaped tongue piece of stainless steel. The tongue piece is inserted in a horizontal slot in the transverse block and the rearward projecting member of the assembly is inserted in the cassette chamber opening. When pulled by hand, a projecting ridge on the tongue piece bears against the inside edge of the chamber opening. A cylinder lock is rotated to engage a slot cut in the tongue piece, preventing the device from being removed.

U.S. Pat. No. 4,640,106 uses an assembly to cover the cassette door opening and a "U" shaped body bolt together with a threaded rod for insertion in the cassette chamber. A locking element located on the threaded rod is rotated in position by a cylinder lock to prevent removal of the device.

U.S. Pat. No. 4,856,304 is considered the most simple in construction. However, the tongue piece remains somewhat complex. It is also limited in its adjustment stops, using either slots for a cam lock or holes for a padlock.

SUMMARY OF THE INVENTION

The present invention relates to a device for preventing the unauthorized use of a computer disk drive, a cassette tape deck, CD player or similar equipment. The invention improves on U.S. Pat. No. 4,856,304 in that the locking mechanism utilizes a "showcase" type lock, rather than the described "T" shaped member tongue piece and cam lock or padlock to hold the block assembly in place in the disk drive, cassette tape deck, CD player or similar equipment. This use of a "showcase" type locking mechanism provides an increased number of adjustment stops for the user, while simplifying the device further in its construction, reducing its costs.

The principal object of the present invention is to provide a device that presents the user with an improved lock adjustment capability, when used to block access to computer disk drives and the like, as well as providing a simpler, lower cost device construction.

Further objects and advantages of the present invention will become apparent from a study of the following portion off the specification, the claims and the attached drawings.

DESCRIPTION OF THE PREFERRED AND ALTERNATE EMBODIMENTS

Figure 1:
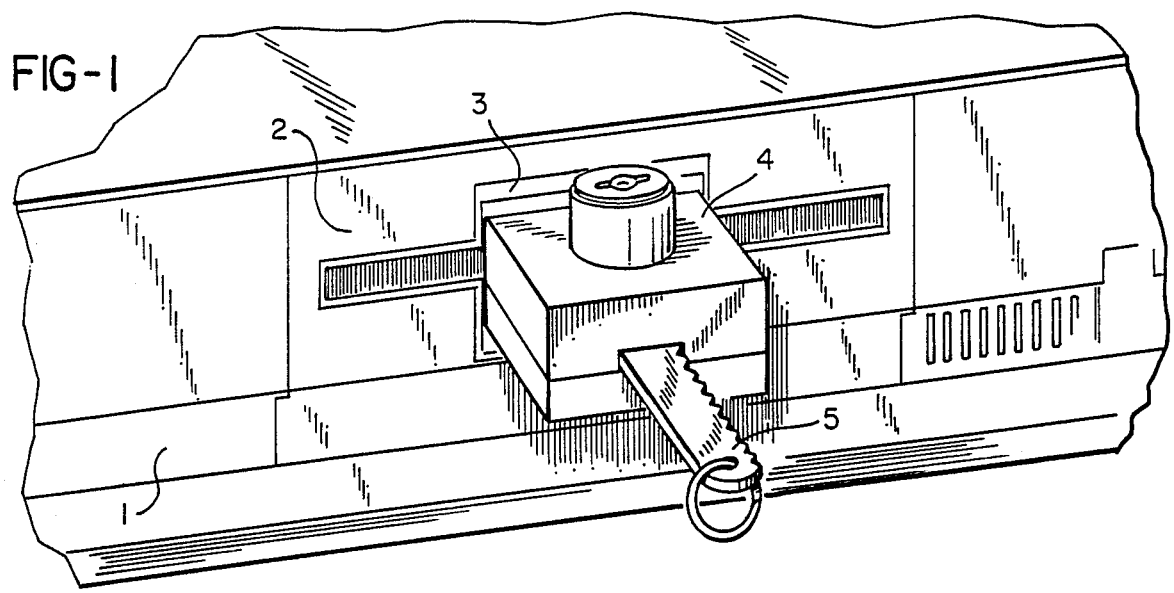
FIG. 1 is a front perspective view of the preferred embodiment of the present invention, installed in a computer disk drive and locked in place.
Figure 2:
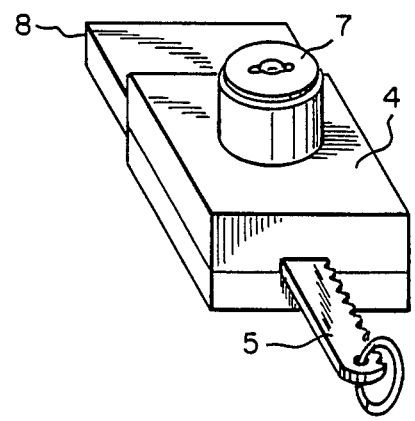
FIG. 2 is a front perspective view of the preferred embodiment of the present invention, assembled and ready for use.

Referring particularly to the drawings, there is shown in FIGS. 1 and 2, a preferred embodiment of the present invention. In FIG. 1, a partial view of a computer 1, particularly showing its floppy disk drive 2 and drive slot 3, illustrates the use of the invention. The transverse block 4 of the device is shown inserted in the drive slot 3 with its locking element 5 pulled forward tightly, so that the transverse block 4 bearing surfaces are pushed hard against the wall of the disk drive 2, covering access to the drive slot 3. FIG. 2 shows a perspective of the device ready for insertion in a disk drive, tape deck or other similar equipment such as a CD player. Also shown is a partial view of the rearward bearing member 8, against which the locking element 5 bears and is located.

Figure 4:
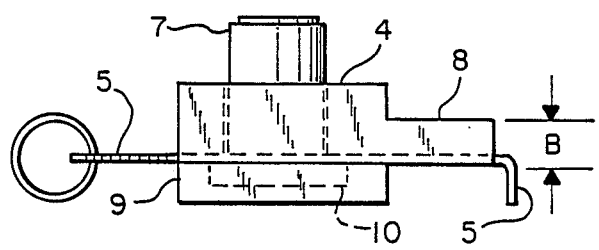
FIG. 4 is a side elevation view of the present invention.
Figure 5:
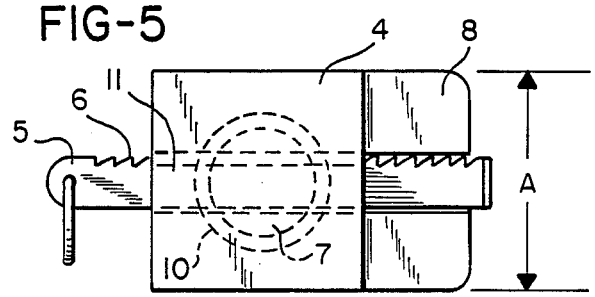
FIG. 5 is a bottom plan view of the device, particularly showing the serrated edge of the locking element which is located in its guide slot at the center of the block.
Figure 3:
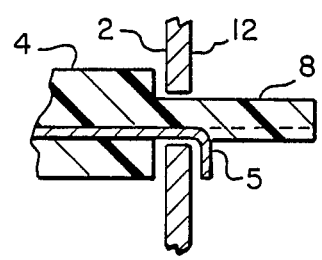
FIG. 3 is a partial cross-section view of a computer disk drive wall at its slot and part of the locking device inserted in the slot, particularly showing how the locking element hooks on to the inside surface of the drive wall, including a view of the rearward member filling the slot height.

Referring to FIG. 3, the device is held tight to the disk drive wall 2 by a bend in the locking element 5, shown in its pulled forward position, hard against the inside surface 12 of the disk drive wall. This same hooking arrangement works just as well when the device is used with a cassette tape deck or CD player. The only difference in the device used for each equipment is its dimensions. Referring to FIGS. 4 and 5, the block width "A" for a cassette tape deck lock device would be about 2.5 inches and the rearward member 8 thickness "B" about 0.40 inches. This compares with a block width of about 1.3 inches and a rearward member thickness of about 0.15 inches for the computer disk drive locking device. The larger width for the cassette tape deck device is required so that the device rearward member 8 may completely fill the tape deck opening, acting like a cassette while preventing side play of device and slot.

In FIGS. 4 and 5, the cylinder lock 7 is shown located perpendicular to the axis of the locking element 5 and the transverse block 4. The transverse block 4 is made of a rigid plastic while the locking element 5 is made of 0.050 inch thick stainless steel or equivalent strength material.

The locking element 5 represents an improvement over the equivalent function performed by a "T" shaped tongue piece in an earlier invention (U.S. Pat. No. 4,856,304). Its action together with the vertical cylinder lock 7, is based on the well known "showcase" type lock, possessing compactness, simplicity and relatively fine adjustment. The locking element 5 achieves these attributes by having a fine sawtooth edge 6 cut in one edge of the element 5, with the sawtooth having a typical width, peak to valley, of 0.10 inches. This allows adjustment of the locking element in 0.10 inch or less steps. The element also has a narrow width typically of approximately 0.375 inches; a thickness of only approximately 0.050 inches and a length of approximately 3 inches. One end of the locking element 5 is bent at a right angle to the plane of the element for a length of approximately 0.25 inches, forming a "hook" to enable hooking onto the inside surface 12 of the disk drive wall as shown in FIG. 3. The locking element 5 is used in conjunction with a cylinder lock 7 which is placed normal to the plane of the locking element 5. In this embodiment, the cylinder lock 7, when a key is inserted in it and rotated, projects a rounded pin which acts against the sawtooth edge 6 of the locking element 5, allowing the element to be pulled and ratcheted forward only.

Manufacture of the transverse block 4 can be in one or two parts: an upper section including the rearward member 8 and a lower section 9. A circular cutout 10 is 5 made in top surface of the lower section 9 to accommodate the bottom portion of the cylinder lock 7. A hole is cut vertically in the center of the upper section; the hole diameter being sized to accommodate the cylinder lock 7 casing. Also, a groove 11 is cut in the upper section as shown in FIG. 5, to provide a guide location for the locking element 5. The transverse block 4 is assembled after the cylinder lock 7 is first inserted in place; the lower section 9 of the block being either glued or fastened by screws to the upper section.

Figure 6:
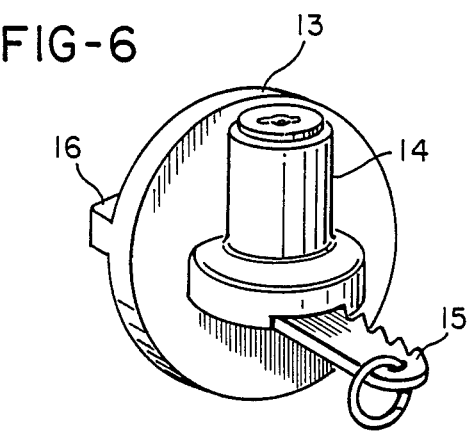
FIG. 6 is a front perspective view of an alternate embodiment of the present invention, particularly showing how the cylinder lock may be separately used apart from the block.
Figure 7:
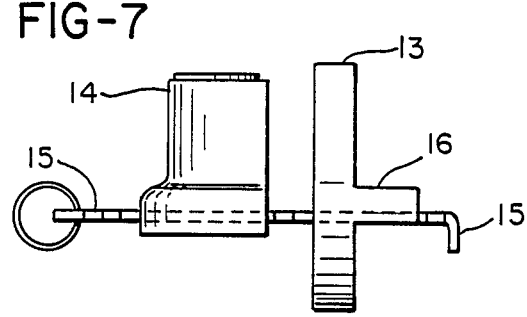
FIG. 7 is a side elevation view of the alternate embodiment of the device.
Figure 8:
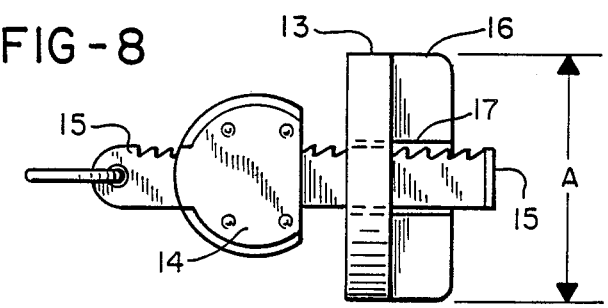
FIG. 8 is a bottom plan view of the alternate embodiment of the device, particularly showing the locking element which is located in its guide slot at the center of the block and the relationship of the cylinder lock that can slide along the locking element.

Referring now to FIGS. 6, 7 and 8, there are shown views of an alternate embodiment of the instant invention. In this embodiment, the block 13 is one piece of rigid plastic, formed in a disk shape and including a rearward projecting member 16. The disk-shaped block 13 serves the same purpose as the transverse block 4 of the preferred embodiment, in blocking access to computer disk drives when the rearward member 16 is inserted in the drive slot. A slot is cut in the center of the block 13, continuing as a groove 17 in the surface of the rearward projecting member 16. The purpose of the slot and groove is to accommodate and guide the locking element 15 as shown in FIGS. 7 and 8.

The locking element 15 is exactly the same as that used in the preferred embodiment, except that its length is shorter by one inch because the thickness of the disk-shaped block 13 is also about one inch less than the block in the preferred embodiment. It operates in the same manner. The major difference in this embodiment, is that the cylinder lock 14 is not located in and held by the block, but rather slides along the locking element 15 as required. In use, the block rearward projecting member 16 is inserted in the disk drive slot and the locking element 15 is pulled forward so that the bent portion of the locking element 15 hooks against the inner wall of the disk drive. The cylinder lock 14 is then slid forward until it abuts hard against the front surface of the disk-shaped block 13, effectively holding the device locked in place. It should be noted, that the cylinder lock 14 is specially shaped with one side of its casing long axis flattened in order to be able to abut the front surface of the block 13 properly.

Referring to FIG. 8, the width "A" of the rearward member 16 is dependent on the width and height of the disk drive slot in which it is intended to be inserted. A typical width would be 1.3 inches for current makes of disk drives. It could also be as much as 5 inches wide, depending on the device application.

Finally, as depicted in FIGS. 6, 7 and 8, the alternate embodiment of the locking device represents what is considered to be the utmost simplification of a locking device for computer disk drives and the like. It is simple to use and simple to manufacture. As such, it is believed to be a worthy improvement on the prior art.

Various changes and modifications may be made in the construction and mode of operation of the locking device described above. These changes, which are in accordance with the spirit of this invention, come within the scope of the appended claims and are embraced thereby.

Having described the invention, what is claimed is:

1. An improved locking device for computer disk drives, cassette tape decks or the like, for insertion into the disk drive or cassette chamber opening and for blocking access to said opening, the device comprising:
   (a) a transverse block,
   (b) a locking element, and
   (c) a cylinder lock; said transverse block further comprising upper and lower sections, both being made of a rigid plastic material; said transverse block width being from 1.3 to 5 inches wide, depending on the device application; said upper section incorporating a rearward bearing member for the purpose of insertion in said disk drive or cassette chamber opening and also providing a surface against which said locking element bears; said upper section including a groove cut in its lower surface for accommodating and guiding said locking element, also having a hole cut vertically in its to surface of a diameter sufficient to accommodate said cylinder lock; said lower section having a circular cutout in its top surface sufficient to accommodate the bottom of said cylinder lock;

said locking element being made of 0.050 inches stainless steel or equivalent strength material, and having a width of approximately 0.375 inches and a length of approximately 3 inches; one end of said locking element being bent at a right angle to the plane of the element for a length of approximately 0.25 inches, forming a "hook" to enable hooking on to the inside wall of said disk drive or cassette chamber opening; said locking element having a sawtooth cut along one longitudinal edge, said sawtooth having a typical width, peak to valley, of 0.10 inches in order to obtain a fine adjustment in the position of said locking element when it is moved in said locking device; said cylinder lock being inserted in the hole in said upper section of said transverse block and said lower section then glued or otherwise fastened to said top section, securing said cylinder lock in place; said locking element being inserted in said groove in said upper section, completing assembly of said device; said cylinder lock, when a key is inserted in it and rotated, projecting a pin which acts against the sawtooth edge of said locking element, allowing said locking element to be pulled and ratcheted forward only;

said locking device, when said rearward member and said locking element are inserted in the opening of a disk drive, cassette tape deck or the like, being held in place by the positioning of said rearward member and the bent end of said locking element hooked over the disk drive wall; said locking element then being pulled forward until the rear surface of said transverse block bears hard against the front surface of said disk drive or cassette tape deck, blocking access to said opening, preventing device removal and unauthorized use of said disk drive, cassette tape deck or similar equipment.

2. The locking device as defined in claim 1, wherein: said rearward bearing member of said transverse block, has a thickness from 0.15 inches to 0.40 inches, depending on the slot height application of said device, and a width of 1.3 inches to 5 inches.

3. An improved locking device for computer disk drives, cassette tape decks or the like, for insertion into the disk drive or cassette chamber opening and for blocking access to said opening, the device comprising:
(a) a block,
(b) a locking element, and
(c) a cylinder lock;

said block being formed in a disk shape and including a rearward projecting member in a single piece of rigid plastic material; said block diameter being from 1.3 to 5 inches wide wide, depending on the device application; said rearward bearing member being for the purpose of insertion in said disk drive or cassette chamber opening and also providing a surface against which said locking element bears; said block having a slot cut in the center of the disk face, and a continuing groove cut in said rearward projecting member surface for accommodating and guiding said locking element, said locking element being made of 0.050 inches stainless steel or equivalent strength material, and having a width of approximately 0.375 inches and a length of approximately 2 inches; one end of said locking element being bent at a right angle to the plane of the element for a length of approximately 0.25 inches, forming a "hook" to enable hooking on to the inside wall of said disk drive or cassette chamber opening; said locking element having a sawtooth cut along one longitudinal edge, said sawtooth having a typical width, peak to valley, of 0.10 inches in order to obtain a fine adjustment in the position of said locking element when it is moved in said locking device; said locking element, when assembled in said device, being placed in said slot in said block and guided by said groove in said rearward projecting member;

said cylinder lock being metal and shaped so that one side of its casing long axis is flattened, in order to be able to abut the front surface of said block; said cylinder lock riding on and being held up vertically by said locking element which is inserted in it; said cylinder lock, when a key is inserted in the lock face and rotated, projecting a pin which acts against the sawtooth edge of said locking element, allowing said cylinder lock to be slid towards said disk shaped block and said locking element to be pulled forward only;

said locking device, when said rearward member and said locking element are inserted in the opening of a disk drive, cassette tape deck or the like, being held in place by the positioning of said rearward projecting member and the bent end of said locking element hooked over the disk drive wall; said locking element then being pulled forward until the rear surface of said disk shaped block bears hard against the front surface of said disk drive or cassette tape deck, blocking access to said opening, preventing device removal and unauthorized use of said disk drive, cassette tape deck or similar equipment.

4. The locking device as defined in claim 3, wherein: said rearward projecting member of said block has a thickness of from 0.15 inches to 0.40 inches, depending on the device application.

* * * * *